US006912461B2

(12) United States Patent
Poreda

(10) Patent No.: US 6,912,461 B2
(45) Date of Patent: Jun. 28, 2005

(54) MULTIPLE APPROACH TIME DOMAIN SPACING AID DISPLAY SYSTEM AND RELATED TECHNIQUES

(75) Inventor: Stanley J. Poreda, Hubbardston, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/127,904

(22) Filed: Apr. 23, 2002

(65) Prior Publication Data

US 2003/0200024 A1 Oct. 23, 2003

(51) Int. Cl.[7] ......................... G01S 13/76; G01S 13/91; G06F 7/70

(52) U.S. Cl. .......................... 701/120; 701/301; 342/29

(58) Field of Search ................................ 701/120, 301, 701/121, 122; 342/29, 36, 42, 125, 357.09, 357.1, 49, 82, 455

(56) References Cited

U.S. PATENT DOCUMENTS

| | | | | | |
|---|---|---|---|---|---|
| 3,882,497 | A | * | 5/1975 | Klass et al. | 343/6.5 LC |
| 3,959,793 | A | * | 5/1976 | Litchford | 343/6.5 R |
| 4,052,721 | A | * | 10/1977 | Ross | 343/6.5 LC |
| 4,107,674 | A | * | 8/1978 | Funatsu et al. | 343/6.5 R |
| 4,196,474 | A | * | 4/1980 | Buchanan et al. | 364/461 |
| 4,823,272 | A | * | 4/1989 | Inselberg | 701/301 |
| 4,839,658 | A | * | 6/1989 | Kathol et al. | 342/455 |
| 4,890,232 | A | | 12/1989 | Mundra | 701/120 |
| 4,949,267 | A | * | 8/1990 | Gerstenfeld et al. | 364/439 |
| 4,970,518 | A | * | 11/1990 | Cole, Jr. | 342/37 |
| 5,058,024 | A | * | 10/1991 | Inselberg | 701/301 |
| 5,200,901 | A | | 4/1993 | Gerstenfeld et al. | 364/439 |
| 5,548,515 | A | | 8/1996 | Pilley et al. | 701/120 |
| 5,877,721 | A | * | 3/1999 | Tsang et al. | 342/36 |
| 6,049,754 | A | | 4/2000 | Beaton et al. | 701/204 |
| 6,085,145 | A | * | 7/2000 | Taka et al. | 701/120 |
| 6,133,867 | A | * | 10/2000 | Eberwine et al. | 342/29 |
| 6,313,783 | B1 | * | 11/2001 | Kuntman et al. | 342/32 |
| 6,393,358 | B1 | * | 5/2002 | Erzberger et al. | 701/120 |
| 6,483,454 | B1 | * | 11/2002 | Torre et al. | 342/30 |
| 6,571,167 | B2 | * | 5/2003 | Schmidt | 701/120 |

FOREIGN PATENT DOCUMENTS

| | | |
|---|---|---|
| EP | 0 283 723 A2 | 9/1988 |
| GB | 2 022 829 A | 12/1979 |
| WO | WO 01/15119 A1 | 3/2001 |

OTHER PUBLICATIONS

PCT/US 03/12307 International Search Report dated Aug. 4, 2003.

Mitre Working Paper on Functional Specification for the Converging Runway Display Aid (CRDA), MCF 3407, Dec. 1990, 15 pgs, May 1992.

Memphis International Airport, Capacity Enhancement Plan Update, Oct. 1997, 40 pgs.

T.J. Davis, K.J. Krezeczowski, and C. Bergh, The Final Approach Spacing Tool, Sep., 1994, pp. 1–8, Palo Alto, California.

CTAS Description, pp. 1–3, Dec. 18, 2000.

Fast Approaching Spacing Tool, pp. 1–15, May, 2, 2003.

CAATS Traffic Management Advisor (TMA), http://www.ctas.arc.nasa.gov/project_description/tma, Jan. 2, 2002, pp. 1–21.

* cited by examiner

*Primary Examiner*—Tan Q. Nguyen
*Assistant Examiner*—Dalena Tran
(74) *Attorney, Agent, or Firm*—Daly, Crowley, Mofford & Durkee, LLP

(57) ABSTRACT

A method for displaying a separation time interval of at least one of a plurality of objects approaching a reference includes estimating a transit time of the at least one of the plurality of objects assigned to a corresponding first path to the reference, determining the separation time interval for the at least one object, and forming a time line axis. The method further includes displaying a representation of the at least one object aligned relative to the time line axis for indicating the estimated transit time, and displaying the separation time interval.

39 Claims, 12 Drawing Sheets

MULTIPLE APPROACH TIME DOMAIN SPACING AID DISPLAY SYSTEM AND RELATED TECHNIQUES

CROSS-REFERENCE TO RELATED APPLICATIONS

Not applicable.

STATEMENTS REGARDING FEDERALLY SPONSORED RESEARCH

Not applicable.

FIELD OF THE INVENTION

This invention relates generally to air traffic control and more particularly to systems and techniques to display transit times and separation time intervals of arriving aircraft.

BACKGROUND OF THE INVENTION

As is known in the art, air traffic control is a service to promote the safe, orderly, and expeditious flow of air traffic. Safety is principally a matter of preventing collisions with other aircraft, obstructions, and the ground; assisting aircraft in avoiding hazardous weather; assuring that aircraft do not operate in airspace where operations are prohibited; and assisting aircraft in distress. Orderly and expeditious air traffic flow assures the efficiency of aircraft operations along selected routes. It is provided through the equitable allocation of resources to individual flights, generally on a first-come-first-served basis.

As is also known, air traffic control services are provided by air traffic control systems. Air traffic control systems employ a type of computer and display system that processes data received from air surveillance radar systems for the detection and tracking of aircraft. Air traffic control systems are used for both civilian and military applications to determine the identity, location, heading, speed and altitude of aircraft in a particular geographic area. Such detection and tracking is necessary to direct aircraft flying in proximity of one another and to warn aircraft that appear to be on a collision course. When the aircraft are spaced by less than a so-called minimum separation standard (MSS) the aircraft are said to "violate" or be in "conflict" with the MSS. The MSS separation can be measured in distance or time, but MSS is typically a time separation standard within the terminal area. In this case the air traffic control system provides a so-called "conflict alert."

Conventional systems such as the En Route Automation Modernization (ERAM) system in the United States and the Canadian Automated Air Traffic System (CAATS) in Canada provide control of IFR (instrument flight rules) aircraft outside terminal air space. These conventional systems additionally schedule and sequence the entry of these aircraft into the terminal airspace, which generally extends 20–40 nautical miles from an airport. Conventional procedures provide separation outside the terminal airspace and provide spatial displays of the relative locations of aircraft within a selected field of view. The separation requirements inside terminal air space are different from separation requirements used outside terminal air space due to lower aircraft speeds, dense air traffic, and shortened time intervals between aircraft. Within the terminal airspace, air traffic controllers manage the separation of aircraft using situation displays that receive processed data from surveillance radars and other air traffic control (ATC) systems.

Examples of managing the separation of aircraft within the terminal air space include managing situations where respective flights are individually assigned to and are following each of two published approaches that lead to crossing runways. In the crossing runway example, the controller must space arriving aircraft so that two aircraft do not arrive at the point of intersection at, or nearly at, the same time. Other examples include situations where two streams of traffic are approaching a pair of closely spaced parallel runways or where two or more streams of traffic are converging on a final approach course. In the United States, and other countries, flights arriving at busy airports are typically assigned scheduled arrival times before entering terminal airspace. This establishes an arrival sequence at the airport and permits the terminal controller to focus on maintaining required separation between consecutive arriving aircraft. In the situations described above, the air traffic controller can direct an aircraft to alter its speed, heading, or to switch to another approach in order to maintain a required separation time interval. By properly spacing aircraft, the air traffic controller can maximize the use of resources within the terminal air space while maintaining safety.

An air traffic control tool, called the Traffic Management Advisor (TMA) developed for the Federal Aviation Administration (FAA), provides a time-based display. TMA is intended as an aid in sequencing and scheduling flights that are up to 200 nautical miles distant from their destination airport. For a given flight, the TMA display indicates both the estimated time of arrival (ETOA) for that flight from its current position to some reference point and a corresponding scheduled time of arrival (STOA). The controller then attempts to reduce the difference between the ETOA and the STOA by giving speed change or course adjustment directives to the pilot of the aircraft. TMA is a scheduling and sequencing tool for aircraft before they enter the terminal area for their destination airport and is not used for controlling aircraft within terminal air space. TMA does not provide any indication of required separation, forward or aft, for an aircraft.

U.S. Pat. No. 4,890,232 describes spatial displays to aid air traffic controllers by projecting "ghost" images of flights that are arriving on a first approach, onto a representation of a second approach carrying actual arriving flight traffic converging on a common reference point. The air traffic controller can then provide separation between ghosts and real flights. If the ghosts are correctly projected, this will ensure that no conflicts occur at points where the approaches converge. This approach does not use time-based displays nor does it provide any direct indication of the transit time for flights.

U.S. Pat. No. 4,890,232 describes the use of situation displays that are normally used by air traffic controllers and projection of additional (ghost) images onto the display. However, since these tools are using distance-based displays, there is a problem regarding the placement of the images or ghosts. The problem is caused by variations in the ground speeds of flights in a terminal area. For example if a ghost of a slow moving flight is projected onto an approach where fast moving flights are operating, it is readily not apparent as to whether the ghost should move at the speed of its parent flight or at the speed of aircraft that are on the same approach as the ghost. If the ghost moves at the same speed as its parent flight, a fast moving flight may overtake the ghost before it reaches its reference point. This may cause the controller to divert the faster flight even though there is no real conflict. On the other hand, if the ghost of the slow moving flight travels at a speed that depends on the traffic on its approach then it is not apparent how the speed of the ghost should be calculated or where on the display it is to be placed. There may be more than one flight on that approach and the speeds of these flights may differ. Moreover, the flight speeds generally vary with time. Consequently, there are significant disadvantages to placing ghost images on distance-based displays to serve as a traffic separation tool.

Another problem with spatial or distance-based displays is that it may be difficult to estimate the time separation between flights. This is because flights typically decelerate as they approach the respective intended runway. In fact, the flight speeds decrease by fifty percent or more while they are in the terminal area and before landing. This is the cause of the phenomenon called "traffic compression" where the distance between consecutive flights decreases, as does their distance to the runway. With a time-based display, the displayed "distance" between flights will remain constant, on the average, as they move towards the respective destination runway. Therefore, in certain air traffic control applications, time is the preferable parameter by which aircraft separation should be measured and displayed.

A number of automated air traffic control systems, including the Standard Terminal Automation Replacement System (STARS) of the United States FAA, are capable of automatically alerting controllers of potential conflicts between two flights. A conflict arises when there is insufficient altitude and distance separation between flights. Such tools are primarily intended to warn controllers of situations where the intended paths of two flights cross at the same point and at (nearly) the same time. These collision avoidance tools are not intended to be used as an aid in separating two or more streams of converging air traffic. For terminal operations, collision avoidance tools are likely to either generate too many alerts or too few alerts depending on how they are configured and applied to a particular terminal configuration.

It would, therefore, be desirable to provide a time domain display aid to assist air traffic controllers in spacing two or more streams of aircraft that converge, cross or otherwise come within close proximity within terminal airspace. It would be further desirable to display an indication that there is insufficient time separation between respective flights that are nominally following or destined to follow the same approach or closely spaced approaches, to provide indications of the likely errors of the estimated transit times for each flight between its current position and a reference point, and to use the error information to improve spacing of the aircraft.

SUMMARY OF THE INVENTION

The present invention provides a time-based display having representations of estimated transit times for flights from a current position to a reference point and of required separation time intervals for each flight. The display of objects of interest is updated as new velocity and position data for each flight is received from radars or other surveillance systems. The reference point is selected based on the particular terminal airspace configuration and the display additionally provides indications of potential violations of the separation interval requirements.

In accordance with the present invention, a time domain spacing aid system includes an interface to object location and trajectory information, an operator interface, a display, a display processor adapted to provide signals to the display and to receive commands from the operator interface, and a transit time estimator. Such an arrangement aids an air traffic controller in spacing two or more streams of aircraft that converge, cross or otherwise come within close proximity of each other within the terminal airspace by providing a time-based display that indicates the estimated transit time for a flight from its current position to a reference point and associated separation time intervals for the flight. Such a time domain spacing aid system in a conventional air traffic control system would enhance system performance by providing a time based separation display.

In accordance with a further aspect of the present invention, a method for displaying a separation time interval of at least one of a plurality of objects approaching a reference includes estimating a transit time of the at least one of the plurality of objects assigned to a corresponding first path to the reference, determining the separation time interval for the at least one object, and forming a time line axis. The method further includes displaying a representation of the at least one object aligned relative to the time line axis for indicating the estimated transit time, and displaying the separation time interval. Such a technique can display an indication that there is insufficient time separation between respective flights that are nominally following the same approach or closely spaced approaches. It should be noted that a single object can be displayed with the separation time interval without reference to another object.

In yet another aspect of the invention, the method further includes determining an error range for each of the plurality of objects including at least one of a leading error range of the estimated transit time and a trailing error range of the estimated transit time. Such a technique provides indications of the likely errors of the estimated transit times for each flight between its current position and a reference point, and the error information is also used to improve spacing of the aircraft.

In yet another aspect of the invention, the method further includes comparing a spatial location of the one object with a spatial location of a second object, determining an overtake situation exists between one object and the second object in response to determining that the transit time of the object is less than the transit time of the second object, and that the object is located further in distance from the reference as measured along a predicted path of the object that the second object. The method further includes displaying an indication of the overtake situation. With such a technique the relative positions of the representations of the two flights will be in reverse order on a time-based display as compared to their relative position on a distance-based display, thereby alerting the air traffic controller to the overtake situation.

In one embodiment, the method further includes determining whether an aircraft is a candidate to arrive at the reference. This feature simplifies the display by removing flights, which cannot follow an assigned nominal path, from being included on the display or being included in the calculations of transit time estimates or potential separation violations.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
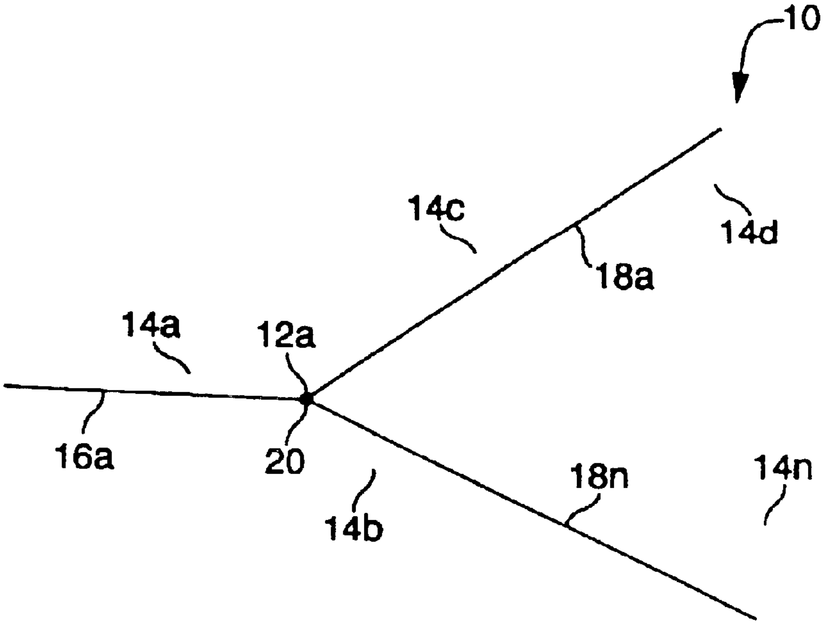
FIG. 1 is a schematic representation of a reference point corresponding to converging approaches of several aircraft.

Before describing the air traffic control system of the present invention some introductory concepts and terminology are explained. The term "maneuver" or "maneuvering" is used herein to describe an intentional or expected change in the velocity of an object (also referred to as an aircraft or flight object) on a path. It should be noted that velocity is defined by a speed and a direction. Thus, an object may be maneuvering even when moving along a straight path. In the description below, objects and paths are referred to in the context of aircraft and runways and runway approaches. It will be appreciated that the term "objects" can include other types of vehicles traveling on corresponding paths. A path can include an approach, a final approach, a runway, and in the case of vehicles other than aircraft, a path can include roadway, sections of railroad track, and sea-lanes. It should be noted that for instrument flight rules (IFR) capable aircraft, there is a path to which the aircraft is assigned and nominally following. This is called the "the assigned path." There is also an actual path that the aircraft is predicted to follow. This is called "the predicted" path. In general, the predicted path is used for transit time calculations.

As used herein, a "reference point" (also referred to as a reference) includes, but is not limited, to a fix (a point on the surface of the earth that is usually described with a latitude and longitude) located on an approach, a runway threshold, an intersection of two approaches or runways, a position located between two fixes on closely spaced approaches, or runways where there is a separation requirement in time and space of aircraft moving proximate to the reference point. A reference point can also be located above the surface of the earth. It is understood that each approach can include a separate reference point that is associated with a physically distinct location. These separate reference points for multiple approaches are selected such that when used for estimated transit time calculations and by the display system described below, the collective set of these reference points will provide transit times having sufficient accuracy to be used for separation of aircraft. As used herein, the terms "reference point" and "reference" when used in conjunction with estimated transit times and the representations of approaches presented on a system display, further refer to the collective set of reference points for flight paths of interest where the corresponding approaches have physically separate reference points.

The terms "flight course", "fix," and "approach," refer to items which have been explicitly established and are generally known to aircraft operators, pilots, and air traffic controllers, for example in the case of an approach, the approach is a permissible approach within the terminal air space as published and made available to air traffic controllers and the operators of aircraft within the terminal air space. For purposes of the present invention, as used herein, the term candidate flight refers to a flight that is nominally following at least one of the flight courses of interest to the air traffic controller. The flight can maneuver onto that flight course with a specified type of maneuver that satisfies certain constraints. The maneuver may include one or two maximum-acceleration turns with an intervening straight segment having a duration that exceeds a prescribed period of time. Constraints on the maneuver may involve the speed and acceleration of the aircraft and the point at which the flight path joins the flight course.

As used herein, a situation display is a display, (e.g. a high resolution color monitor), which can include the integration of surveillance, weather and flight data over a multi-layer color map. The situation display can be interactive, allowing the air traffic controller to access flight data, and obtain status data on airports, and terminal air space.

Now referring to FIG. 1, a terminal air space 10 includes a plurality of aircraft 14*a*–14*n* (generally referred to as aircraft 14) which are required to maintain adequate separation within the terminal air space 10. An aircraft controller is aided in spacing the aircraft 14 by the inventive display system described below. The air space 10 includes a plurality of first and second flight approaches 18*a*–18*n* which intersect with a final approach 16*a* at a fix 12*a*. In this configuration, the fix 12*a* is equivalent to a reference point 20. The air space 10 represents a situation where the paths of flights that are nominally following one of first and second approaches 18*a,* 18*n* converge to join the final approach 16*a* at a fix 12*a*. The fix 12*a* can serve as a reference point 20 for each of the approaches 18*a,* 18*n*. A flight is said to be nominally following a flight course if it is the intended course for the flight as determined by flight data (e.g. data in a flight plan), controller action, stated pilot intention or other suitable means. In the situation depicted in FIG. 1, the controller must provide adequate spacing between aircraft on the first approach 18*a* and the second approach 18*n,* and on the final approach 16*a*. In addition, the controller must insure that adequate spacing is maintained between any flight arriving on the first approach 18*a* and any flight arriving on the second approach 18*n,* before, and after those flights reach the reference point 20. This task is complicated by the fact that the aircraft 14*a*–14*n* may have different ground speeds and may not be closely following their assigned flight courses.

Figure 2:
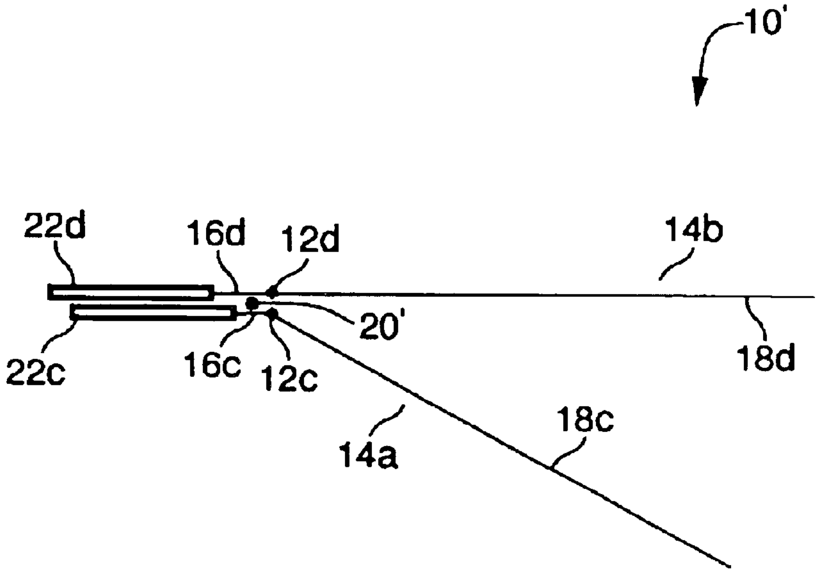
FIG. 2 is a schematic representation of a reference point corresponding to converging approaches on closely spaced parallel runways.

Now referring to FIG. 2 in combination with FIG. 1 in which like reference numbers indicate like elements, an exemplary terminal air space 10' includes a plurality of aircraft 14*a*–14*n* within the air space 10'. The air space 10' includes third and fourth flight approaches 18*c*, 18*d* which join final approaches 16*c*, 16*d* at fixes 12*c*, 12*d*, respectively. The final approach 16*c* is connected to second runway 22*c* which is parallel to a fourth runway 22*d* which is connected to the final approach 16*d*. In this configuration a reference point 20' is located proximate third fix 12*c*, and fourth fix 12*d* where two streams of traffic are converging. The terminal air space 10' represents a situation where the two final approaches 16*c*, 16*d* lead to one of two closely spaced parallel runways 22*c*, 22*d*. A runway centerline is the geometric line that defines the center and heading of a runway. The first point on the runway that is passed over by an arriving flight that is following the runway centerline is referred to as the runway threshold. In the terminal air space of FIG. 2, flights that are nominally following the third approach 18*c* will make a left turn at the third fix 12*c* that is on the (extended) runway centerline and a short distance from the runway threshold. The third fix 12*c* serves as a basis to locate reference point 20' for the third approach 18*c*. Flights that are following fourth approach 18*d* make a straight-in approach to third runway 22*d*. A third fix 12*c* is established on the third approach 18*c* that is aligned with the fourth fix 12*d* on the fourth approach 18*d*. The third and fourth fixes 12*c*, 12*d* provide the reference point 20' for the third and fourth approaches 18*c*, 18*d*. In order to simultaneously use both runways 22*c*, 22*d* for arriving flights, controllers try to provide adequate time spacing between flights arriving on the third and fourth approaches 18*c*, 18*d* as they near their respective third and fourth fixes 12*c*, 12*d* or equivalently reference point 20'. For example, a flight arriving on the third approach 18*c* should pass over the third fix 12*c* and reference point 20' at least two minutes before or after any flight arriving on the fourth approach 18*d* passes over the fourth fix 12*d* and reference point 20'. This time separation depends on the characteristics of the aircraft and could be five minutes if the leading flight is a heavy jet.

Figure 3:
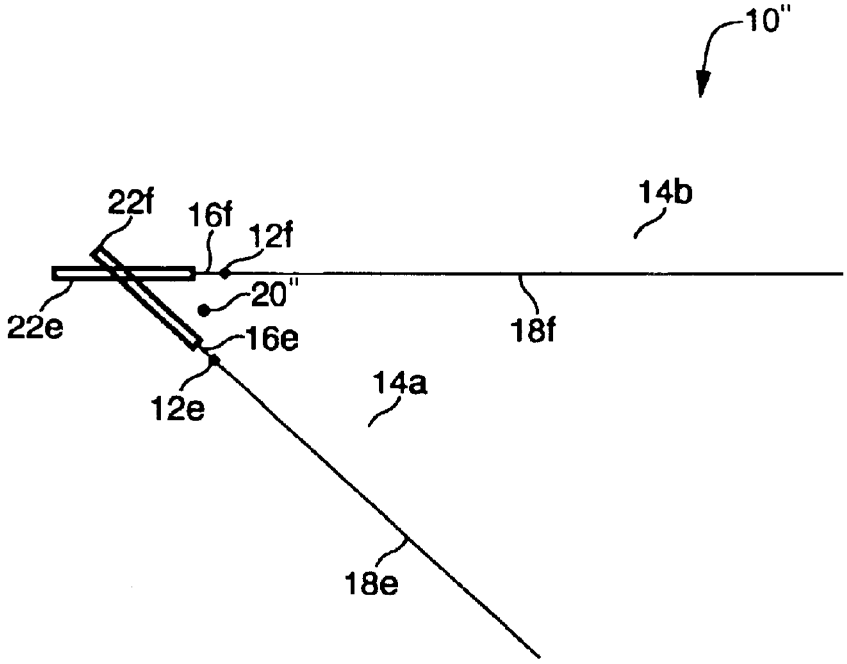
FIG. 3 is a schematic representation of a reference point corresponding to converging approaches on crossing runways.

Now referring to FIG. 3 in which like reference numbers indicate like elements of FIG. 2, an exemplary terminal air space 10" includes a plurality of aircraft 14*a*–14*n* within the air space 10". The air space 10" includes a fifth and sixth flight approach 18*e*, 18*f* which join final approaches 16*e*, 16*f* at a fifth and sixth fix 12*e*, 12*f*, respectively. The fifth approach 16*e* is connected to runway 22*e* which intersects a runway 22f connected to the sixth approach 16*f*. Two streams of air traffic are approaching crossing runways 22*e* and 22*f*. Each fifth and sixth approach 18*e*, 18*f* includes the respective fifth and sixth fix 12*e*, 12*f* that is at, or immediately before, the corresponding runway threshold. The fifth and sixth fixes 12*e*, 12*f* provide a reference point 20" for the approaches. In this situation, the air traffic controller attempts to provide adequate time spacing between flights as they approach the fifth and sixth fixes 12*e*, 12*f* and corresponding reference point 20". For example, a flight arriving on the fifth approach 20*e* should pass proximate the reference point 20" at least two minutes before or after the time that any flight arriving on approach 20f passes over the reference point 20". If these fixes 12*e* and 12*f* are correctly selected, maintaining separation will insure that two landing flights will not reach the crossing point of the two runways at or nearly at the same time.

Figure 4:
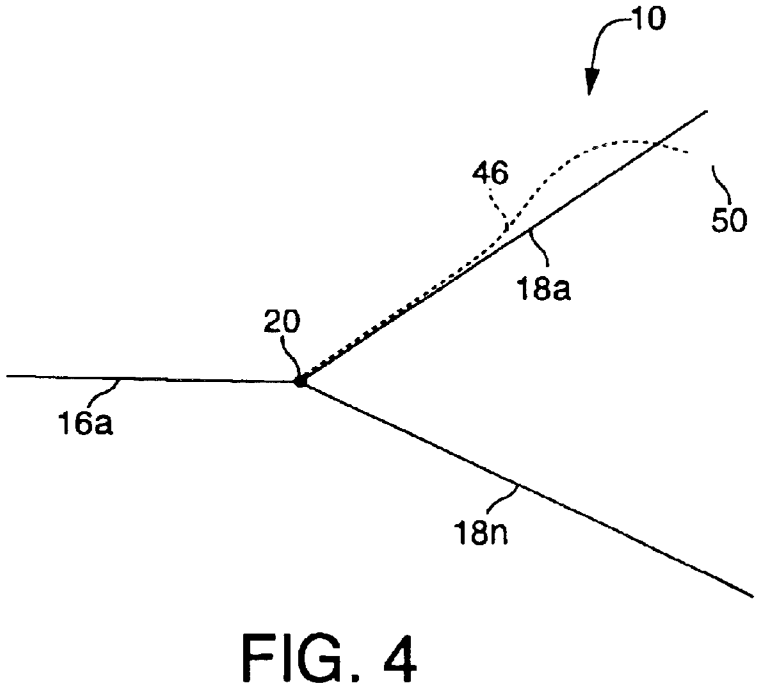
FIG. 4 is a schematic diagram of a determination of a predicted path according to the invention.

Now referring to FIG. 4 in which like reference numbers indicate like elements of FIG. 1, a predicted path 46 for a flight 50 following an assigned nominal path 18*a* is determined in order to estimate the transit time to a reference point 20 for a flight 50 making an approach in the terminal air space 10. In the exemplary situation of FIG. 4, the predicted path 46 includes a constant radius turn to the left, followed by a straight segment, followed by a constant radius turn to the right and then a straight segment ending at the reference point 20. The radius of these turns could be the minimum turning radius, which is determined by the speed of the aircraft and an acceleration constraint. For commercial aircraft this constraint is typically three degrees per second. The transit time to the reference point 20 is calculated along the predicted path 46 and not along the assigned approach 18*a*.

Figure 5:
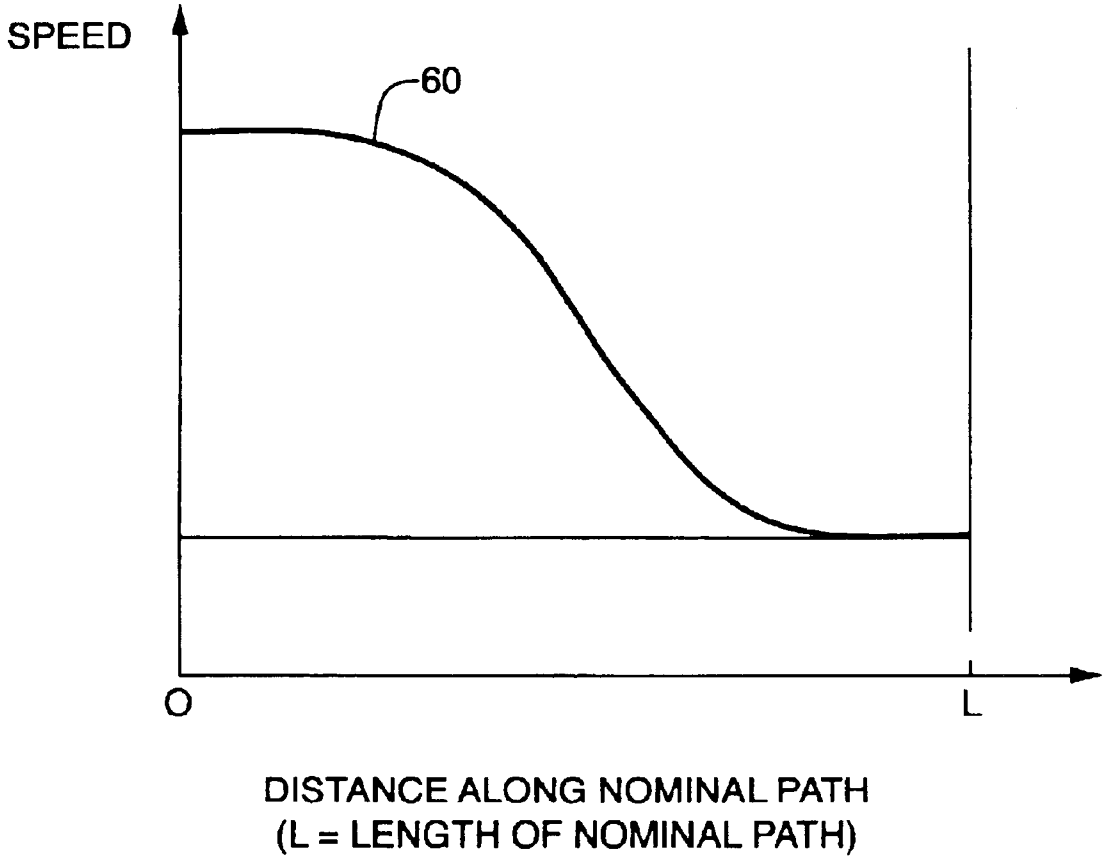
FIG. 5 is a plot of an estimated object speed vs. distance along a predicted path, in accordance with the present invention.

Now referring to FIG. 5, an exemplary estimated speed profile 60 for a flight along the predicted path 46 (FIG. 4) is shown. The speed profile 60 is a function of arc length along the path and indicates the speed for the aircraft at any position along the predicted path. In this example, the speed profile is represented as a continuous function. In alternate embodiments, this function could be a constant, or a step function. Alternatively, the speed profile may be determined based on the historical behavior of flights that recently made comparable approaches. The speed profile 60 is used in conjunction with the predicted path 46 to determine whether the approach will be a candidate flight and, if so, an estimated transit time to the reference point 20 (FIG. 4) along a predicted path 46 following the nominal path, approach 18*a* (FIG. 4) is calculated. In one embodiment, the transit time required for a flight to reach the reference point from some given initial point P will depend not only on the location of point P but also on the velocity (speed and heading) of the flight at point P. The estimated transit time is calculated using the current velocity but this velocity is in general expected to change. The characteristics of the aircraft, the magnitude and direction of the wind, and possibly other factors such as historical data are used in the transit time calculation and the calculation of variance (i.e. likely error) in the transit time.

Figure 6:
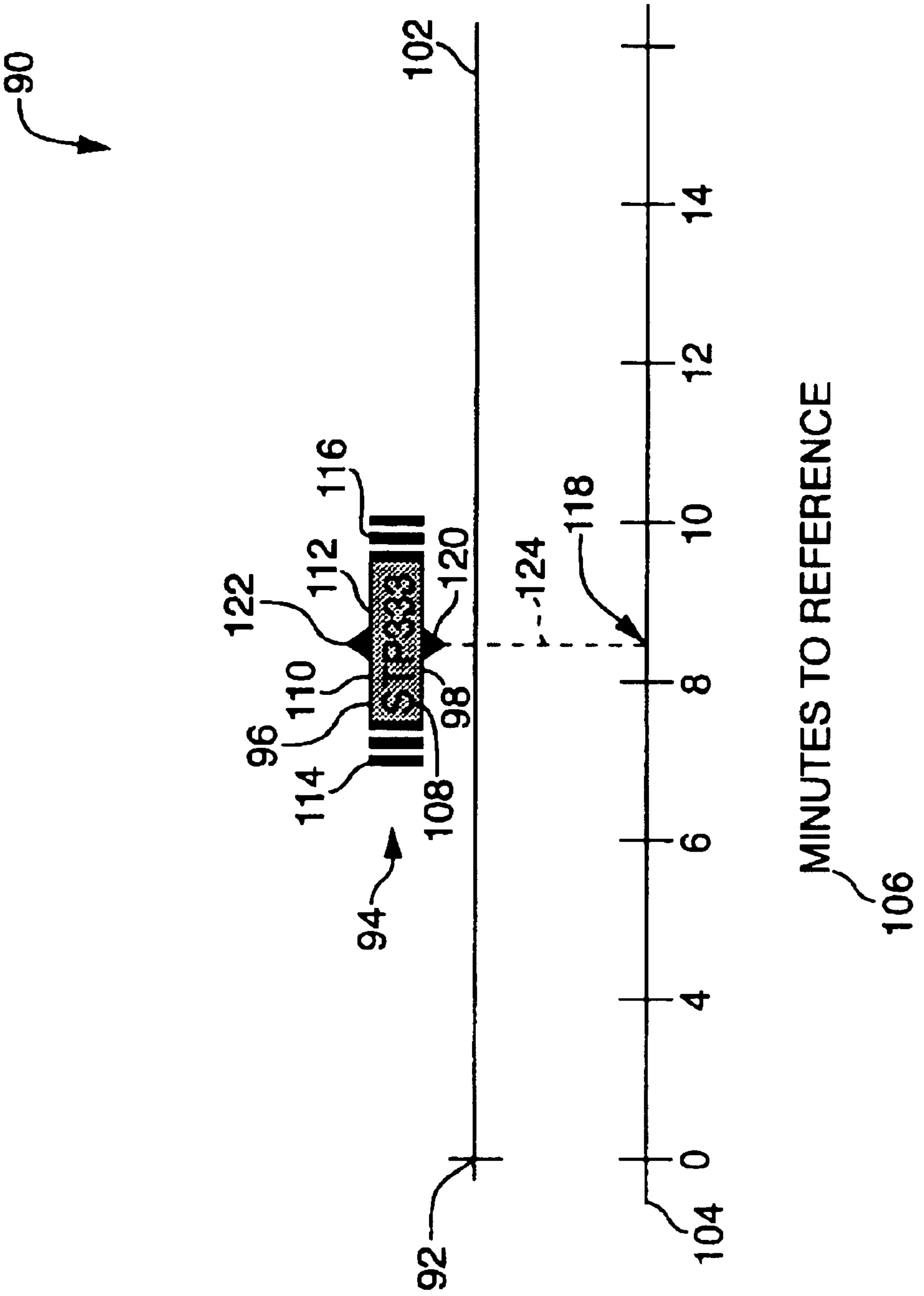
FIG. 6 is a schematic representation of a temporal display of an object indicating a transit time for a first approach to a reference point, according to the invention.

Now referring to FIG. 6, an exemplary multiple approach time domain spacing aid display 90 includes a transit time line axis 104, a graphical representation of an approach 102, and indicia 106 that labels the time line axis 104. The display 90 further includes at least one graphical object, here a flight symbol 94, having a separation box 98, for example, a rectangular box representing an aircraft in flight, which is aligned with the axis 104 and visual aid 124. The flight symbol 94 included a lower time marker 120 and an upper time marker 122 to aid the user in reading the estimated transit to a reference point as represented by time marker 92 on the representation of an approach 102 and corresponding, here, to a "0" minute indicator on axis 104. Each flight symbol 94, also includes an aircraft identifier (ACID) 108. The separation box 98 includes a first length 110 extending from the time markers 120 and 122 representing a required leading separation time interval, for example one minute, a second length 112 extending from the time markers 120 and 122 representing a required trailing separation time interval, for example one minute, a first set of error bars 114 representing an estimated leading error for the transit time interval, and a second set of error bars 116 representing an estimated trailing error for the transit time interval. Time markers 120 and 122 visually separate the leading and trailing dimensions 110, 112 of the transit time interval.

It will be appreciated by those of ordinary skill in the art that the display of FIG. 6 can be provided on a separate monitor or incorporated as a "window" in a display including other object information. The display can optionally include a graphical user interface (GUI) to allow the user to select from one of several reference points and also to select different format and optional features of the display.

In operation, once a flight is determined to be a candidate for an approach, the representation of the aircraft's transit time to the reference point is displayed. In one embodiment, the temporal display 90 includes the graphical one-dimensional transit time scale axis 104 adjacent to flight symbols 94 representing candidate flights. At least one flight symbol 94 is placed according to the corresponding flight's estimated transit time and disposed adjacent the representation of the corresponding approach 102, here a line parallel to the time scale axis 104.

The first length 110 of the extension forward in time of the separation box 98 indicates the required leading separation for the aircraft. For example, if two minutes of separation is required between a leading flight and this aircraft then this extension is representative of one half that time or one minute. The second length of the extension backward in time of the separation box 98 indicates the required trailing separation for the aircraft. For example, if the required separation between a trailing aircraft and this aircraft, is five minutes, and if the minimum required leading separation (for all aircraft) is two minutes, then this extension could be equal to four minutes (five minutes minus one half the minimum required leading separation). The separation times vary by the type of aircraft and the airport landing conditions including for example weather.

The first and second set of error bars 114, 116, here for example, are parallel bars extending from either side of the separation box 98. The lengths of the extension backward and forward in time indicate the likely error for the estimated transit time to the reference point indicated by marker 92. For example, if the estimated speed profile is determined using speed data for previous flights, the likely error could be based on the distribution of those measurements. There is no requirement that the leading error equal the trailing error. The extent of error bars 114, 116 relative to the length of the separation box will generally vary from flight to flight and will be a function of the method used to estimate the transit time and the airport conditions.

In one embodiment, the flight symbols 94 used to represent candidate flights are placed on the display adjacent to the representation of an approach 102 to indicate the approach course the flight is nominally following.

In one particular embodiment, the flight symbols 94 that are displayed on the time-based display optionally include one or more of the following features: at least one time marker 120, 122 which is aligned with a point on the time line axis that is equal to the estimated transit time of the flight from its current position to the reference point on the flight course that the flight is nominally following, and a separation box 98 that extends to the right and left of the time mark. The length of the extension backward in time (to the right) is equal to the required trailing separation for the aircraft. The length of the extension forward in time (to the left) will be, as measured on the time scale, equal to required leading separation.

The separation box 98 optionally includes an aircraft identifier 108. The flight identifier is the aircraft identifier or some other suitable label. Each symbol 94 includes a set of parallel bars extending from either side of the separation box 98. The length of the extension backward will be, as measured on the time scale, equal to the likely trailing error for the estimated transit time. The length of the extension forward will be, as measured on the time scale, equal to the likely leading error for the estimated transit time. The time separation interval between consecutive flights depends on the characteristics of the leading aircraft. In this particular embodiment, each aircraft can have a different required trailing time separation (longer for larger aircraft) and all aircraft have the same required leading time separation.

It will be appreciated by those of ordinary skill in the art that there are numerous ways to display the time separation in addition to displaying a required leading time and trailing separation time. For example, the leading separation time and trailing separation time can be combined and displayed either on the leading or trailing edge of the object representation.

In one embodiment, a time-based display is presented as a window included in a situation display that is normally used by air traffic controllers. The rectangular window will have a horizontal linear time scale at the bottom of the window. The window itself will have adjustable dimensions and will have a default size that occupies approximately ten percent of the display area of the situation display. The window area above the time scale will be divided into up to eight horizontal strips. Each of these strips will be used to display symbols that represent flights that are nominally following up to a predetermined number of corresponding flight courses. As described above, each of the approaches and corresponding flight courses can optionally include a separate selected reference point. The number of horizontal strips corresponding to approaches of interest and related approaches to be displayed is selected according to the particular application and operator input. For example, where a particular application of the inventive display system to a terminal airspace includes two or more converging approaches, the association among these approaches and corresponding identities, for example a name such as "approach 18 north" is saved, for example, in a database to be retrieved when these approaches are displayed. In one particular embodiment, a horizontal strips similar to the representation of the approach 102 are displayed for each of the approaches of interest and related converging or proximate approaches.

Figure 7:
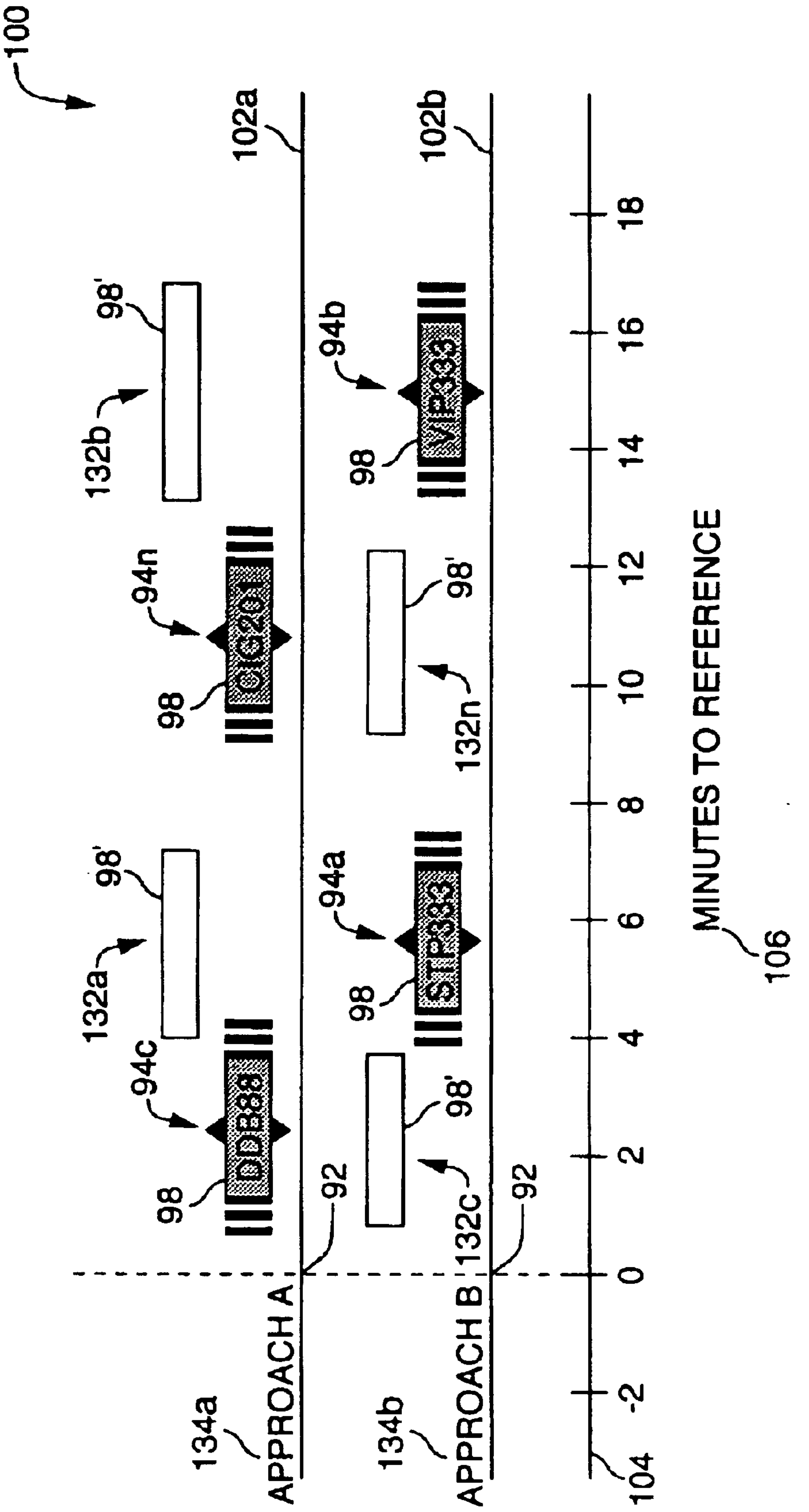
FIG. 7 is a schematic representation of the temporal display of FIG. 6 further including a second approach and ghost images superimposed on a corresponding approach.

Now referring to FIG. 7 in which like reference numbers indicate like elements of FIG. 6, an exemplary multiple approach time domain spacing aid display 100, which is similar to display 90 (FIG. 6), includes graphical representations of two separate approaches, approach A 134*a* and approach B 134*b* converging on a common reference point represented by markers 92, and flight symbols 94*a*–94*n* representing aircraft in flight arriving on the two different approaches 134*a*, 134*b*, respectively. The display 100 further includes position symbols, 132*a*–132*n* (also referred to as ghost images 132). The ghost images 132, here represented by dotted line boxes without aircraft identification indicia, are associated with corresponding flight symbol 94*a*–94*n* and are located proximate a corresponding representative approach 134 different from the actual approach on which the aircraft is flying.

The placement of the ghost images 132, provides a visual aid for the operator to compare the estimated transit time, the required separation and the estimated variance of each candidate flight that is nominally following one of plurality of converging approaches 134, to the estimated transit time and related data for flights arriving on the other approaches.

In the example of FIG. 7, four flights are displayed with two flights arriving on each of the approaches. The flight symbols 94*a* and 94*b* for flights arriving on approach B are arranged above a horizontal strip 134*b* representing approach B which is disposed above the transit time scale axis 104. The flight symbols 94*c* and 94*n* for flights arriving on approach A 134*a*, are arranged above a horizontal strip

134*a* representing approach A. For each flight arriving on approach B, the system generates the ghost image 132 adjacent the strip 134*a* representing approach A and the "non ghost" flight symbol 94 adjacent the strip 134*b* representing approach B. Each flight symbol 94 can include separation box 98 and each ghost image 132 can include separation box 98'. It will be appreciated by those of ordinary skill in the art that the flight symbols 94, ghost images 132, and separation boxes 98, 98' can include non-rectangular shapes and can be displayed in a variety of colors.

The extent of the separation boxes 98, 98' related to these flight symbols 94 reflects both the required separation and the likely transit time error in the leading and trailing directions. For situations where more than two approaches converge, a representative strip on the display 100 can be assigned to each approach and a position symbol for each flight can be projected on all strips other than the one corresponding to the approach the flight is nominally following.

Figure 8:
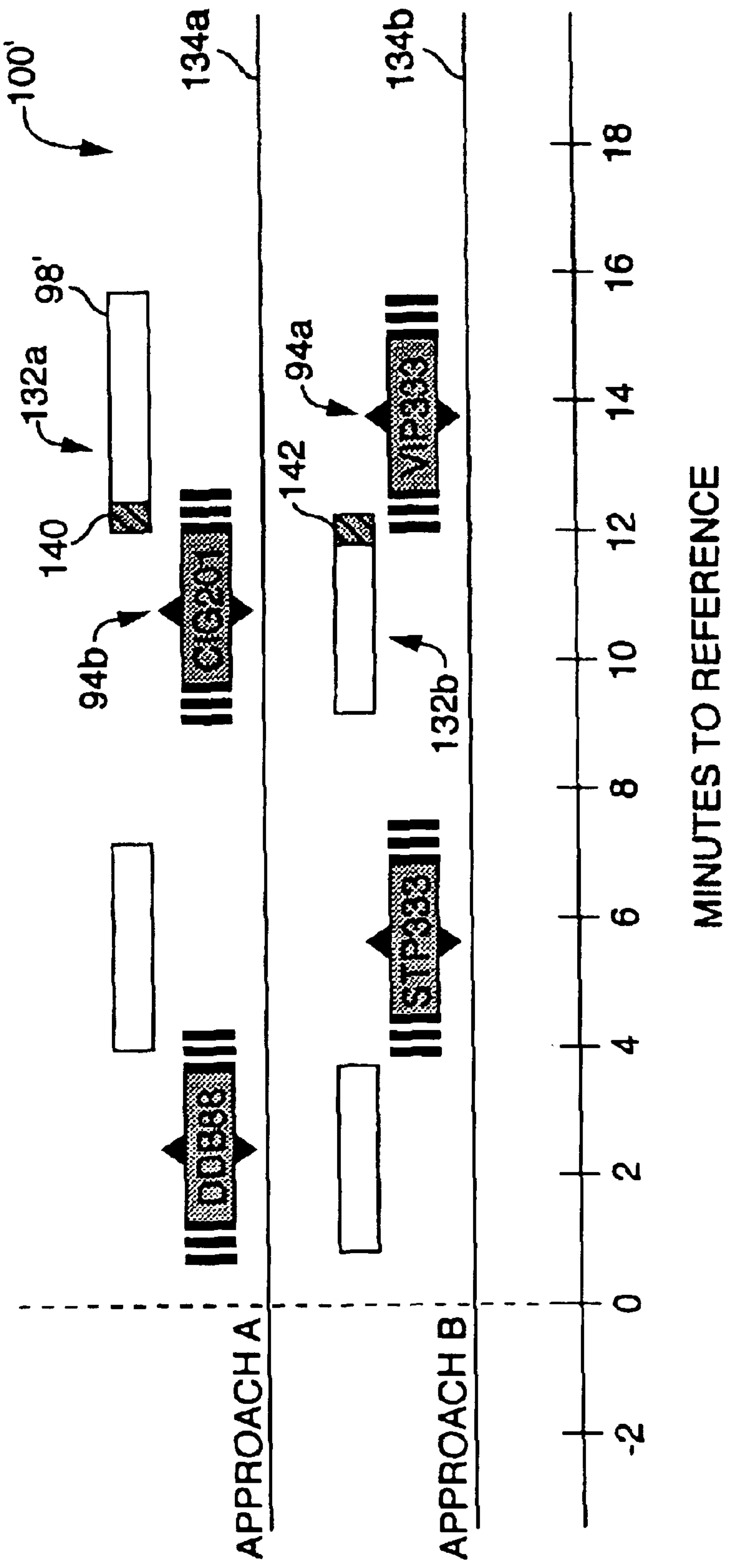
FIG. 8 is a schematic representation of the temporal display of FIG. 7 further including an indication of a likely violation of separation requirements.

Now referring to FIG. 8 in which like reference numbers indicate like elements of FIG. 7, a display 100' which is similar to display 100 (FIG. 7) includes graphical representations of insufficient separation 140 disposed on ghost images 132a and insufficient separation 142 disposed on 132*b* to indicate that there is a likelihood, that there will be insufficient separation between the estimated transit times of the flights represented by flight symbol 94*b* and flight symbol 94*b*.

In the example of FIG. 8, the error bars for flight VIP333 overlap the error bars for flight CIG201. Although these flights are estimated to have adequate separation when they reach the reference point, there is a probability the required separation will be not be achieved because of the factors which produce the leading and trailing errors in the transit times. In one embodiment, graphical representations of likely insufficient separation 140 and 142 are displayed as highlighted fields on the ghost image for these two flights For example, the position symbol for flight VIP333 that is projected onto the strip corresponding to approach A 134*a* includes a highlighted color rectangle that is congruent to the overlap of the error bars for the two flights. This is also true for the position symbol for flight CIG201 that is projected onto the approach B 134*b* strip. A controller may not take immediate action when an indication of this type first appears since the extent of the error bars will generally decrease as the flights move toward their reference points. A subsequent determination of adequate separation results in the automatic removal of the graphical representations of likely insufficient separation 140 and 142. The removal of the indication occurs without any intervention by the operator.

Figure 9:
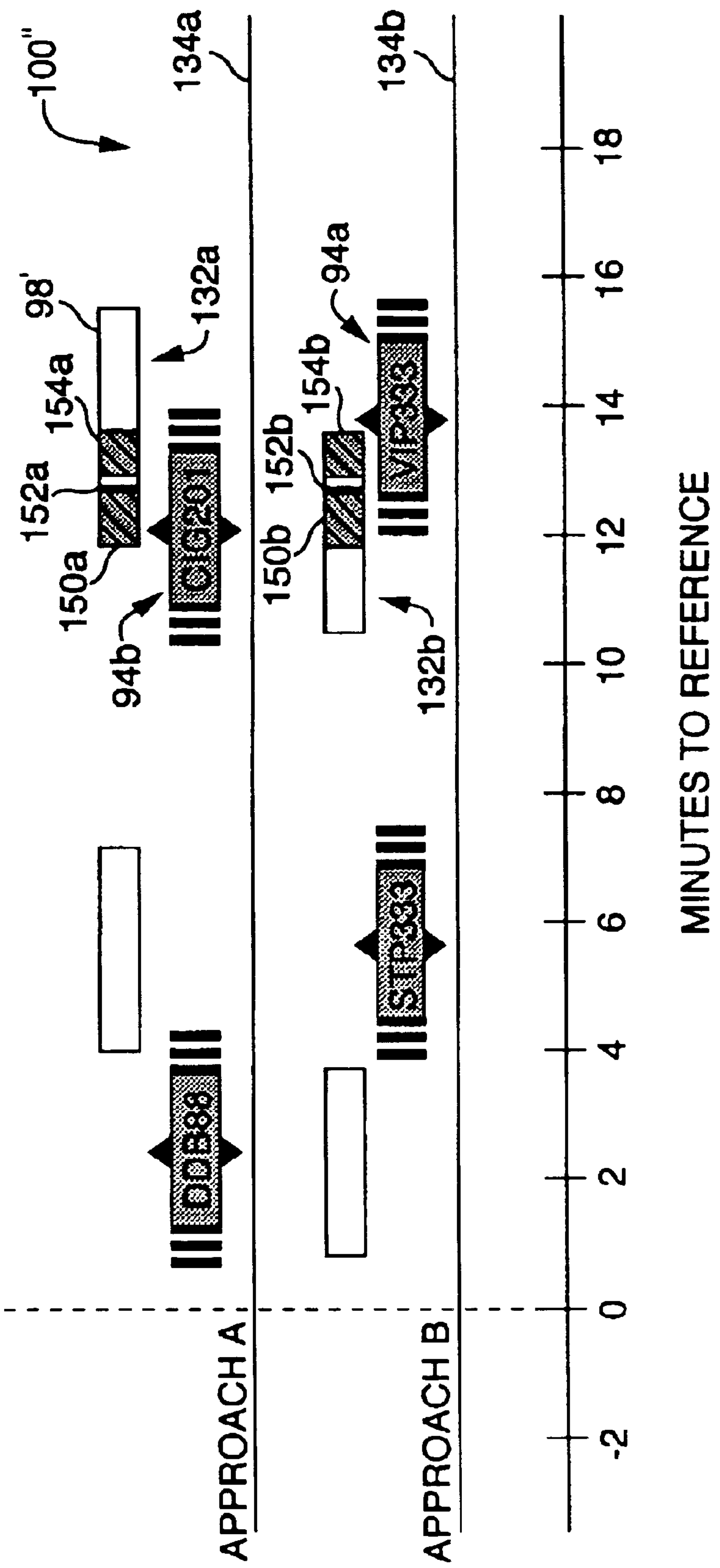
FIG. 9 is a schematic representation of the temporal display of FIG. 8 further including an indication of an expected violation of separation requirements.

Now referring to FIG. 9 in which like reference numbers indicate like elements of FIG. 8, a display 100" which is similar to display 100' (FIG. 8) includes graphical representations of insufficient separation 150*a*, 150*b*, 152*a*, 152*b*, 154*a*, and 154*b* disposed on ghost images 132*a* and 132*b* respectively to indicate that it is expected that there will be insufficient separation between the estimated transit times of the flights represented by flight symbol 94*a* and flight symbol 94*b*.

FIG. 9 depicts a possible embodiment of the invention where an indication is provided when two flights are expected to violate time separation requirements. In this case both the separation box and the error bars for flight VIP333 overlap the separation box and error bars for flight CIG201. When there is an overlap of the separation boxes of two flights this means that the estimated transit times for the two flights violate the required time separation intervals. In other words the flights are expected to be too close together, i.e. closer in time than the minimum separation requirement when they reach the reference point. Note that the overlap occurs in this situation even if the error ranges of the separation time intervals are not considered.

In this embodiment, adding graphical representations of insufficient separation 150*a*, 150*b*, 152*a*, 152*b*, 154*a*, and 154*b* to the ghost images 132*a* and 132*b* for these two flights indicates this situation. In this case, the position symbol for flight VIP333 that is projected onto the approach A 134*a* strip (i.e. ghost image 132*a*) includes separation box 98', here a highlighted rectangle, that is congruent to the overlap of the separation boxes for flight symbols 94*a* and 94*b*. Here, graphical representation 150*a* represents the likely separation violation due to an overlap of the error range of flight symbol 94*a* with the required separation time interval of flight symbol 94*b*. Graphical representation 152*a* indicates the expected separation violation due to an overlap of the required separation time interval (without error estimates) of the two flights 94*a* and 94*b*. Graphical representation 154*a* represents the likely separation violation due to an overlap of the error range of flight symbol 94*b* with the required separation time interval of flight symbol 94*a*. Corresponding graphical representations of insufficient separation 150*b*, 152*b*, and 154*b* are disposed on ghost image 132*b*.

After viewing the graphical representations of insufficient separation 150*a*, 150*b*, 152*a*, 152*b*, 154*a*, and 154*b*, an air traffic controller can take action to increase the expected separation between the flight represented by flight symbols 94*a* and 94*b*. It will be appreciated by those of ordinary skill in the art that the graphical representations of insufficient separation 150*a*, 150*b*, 152*a*, 152*b*, 154*a*, and 154*b* can be represented by highlighted fields using shading, graphics or different colors, and that the representations can be combined to simplify the display 100".

Figure 10:
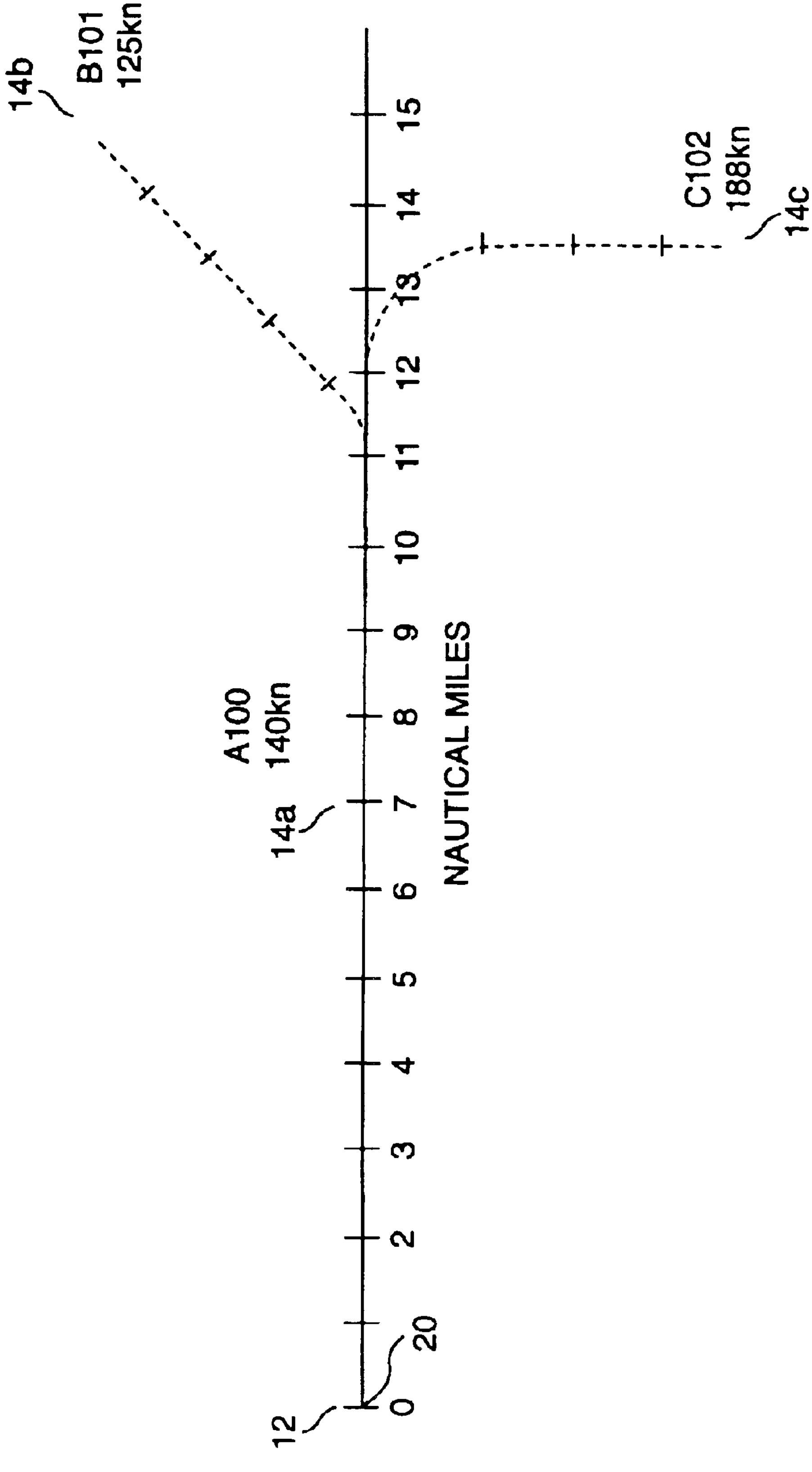
FIG. 10 is a schematic diagram of one object overtaking a second object.

FIG. 10 depicts a scenario where three flights 14*a*, 14*b*, 14*c* are nominally following the same straight flight course. Flights B101 and C102 are approaching the course and predicted paths are indicated. Each flight is assumed to be moving at a constant ground speed as indicated. At the instant depicted in the FIG. 10, flight B101 is 15.8 nautical miles from the reference point when measured along its predicted path. For flight C102 the distance is 17.4 nautical miles. However, because the flights are traveling at different speeds, flight C102 will reach the reference point in 5.54 minutes, which is sooner then the transit time of 7.57 minutes for flight B101. In situation of FIG. 10, flight C102 is more distant from the reference point than is B101 although its estimated transit time is less than flight B101.

Figure 11:
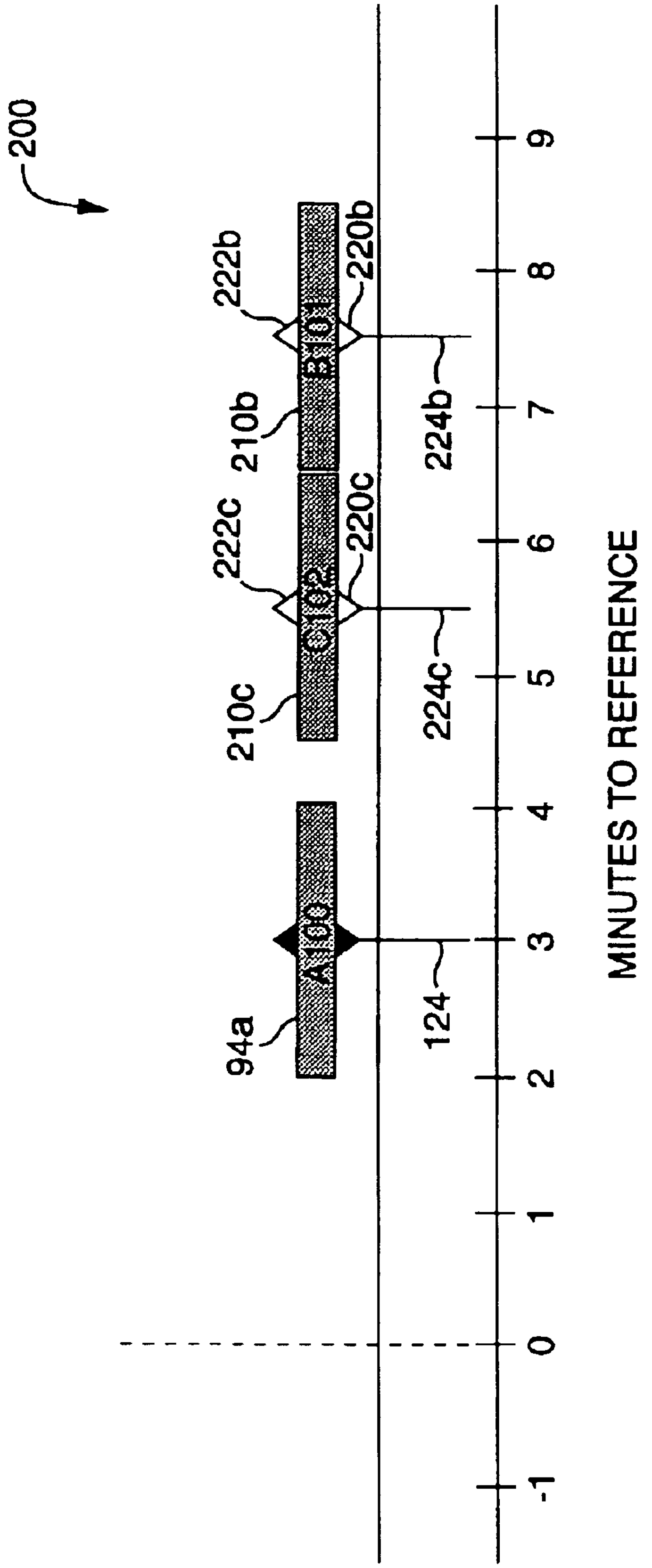
FIG. 11 is a schematic representation of a temporal display of the objects of FIG. 10.

Now referring to FIG. 11 in which like reference numbers indicate like elements of FIG. 6, a display 200 which is similar to display 90 (FIG. 6) includes graphical representations of the overtake scenario of FIG. 10. In such a scenario, it is useful to provide an indication that one flight that is nominally following a flight course is estimated to overtake another flight that is nominally following the same flight course before either flight reaches the reference point for the flight course. The display 200 includes flight symbols 94*a*, 210*b* and 210*c*. The flight symbols 210*b* and 210*c* include time markers 220*b*, 222*b*, 224*b* and 220*c*, 222*c*, 224*c*, respectively, to provide a graphical representation of the overtake scenario to indicate the predicted conflict that arises in the scenario depicted in FIG. 10. In one embodiment, the display 200 does not include the estimated transit time error bars.

In one example, the flight symbols 94*a*, 210*b* and 210*c* for flights A100, C102 and B101 are located at 3.0, 5.54 and 7.57 minutes along the time scale respectively. In this example, there is no violation of time separation requirements as the flights reach the reference point. However, since flight C102 is currently more distant from the reference point than is flight B101 (as depicted in FIG. 10), flight C102 will overtake flight B101 before reaching the reference point. This is indicated, for example, by changing the color of the symbols that correspond to these two flights or otherwise highlighting the flight symbols 210*c* and 210*b*.

Figure 12A:
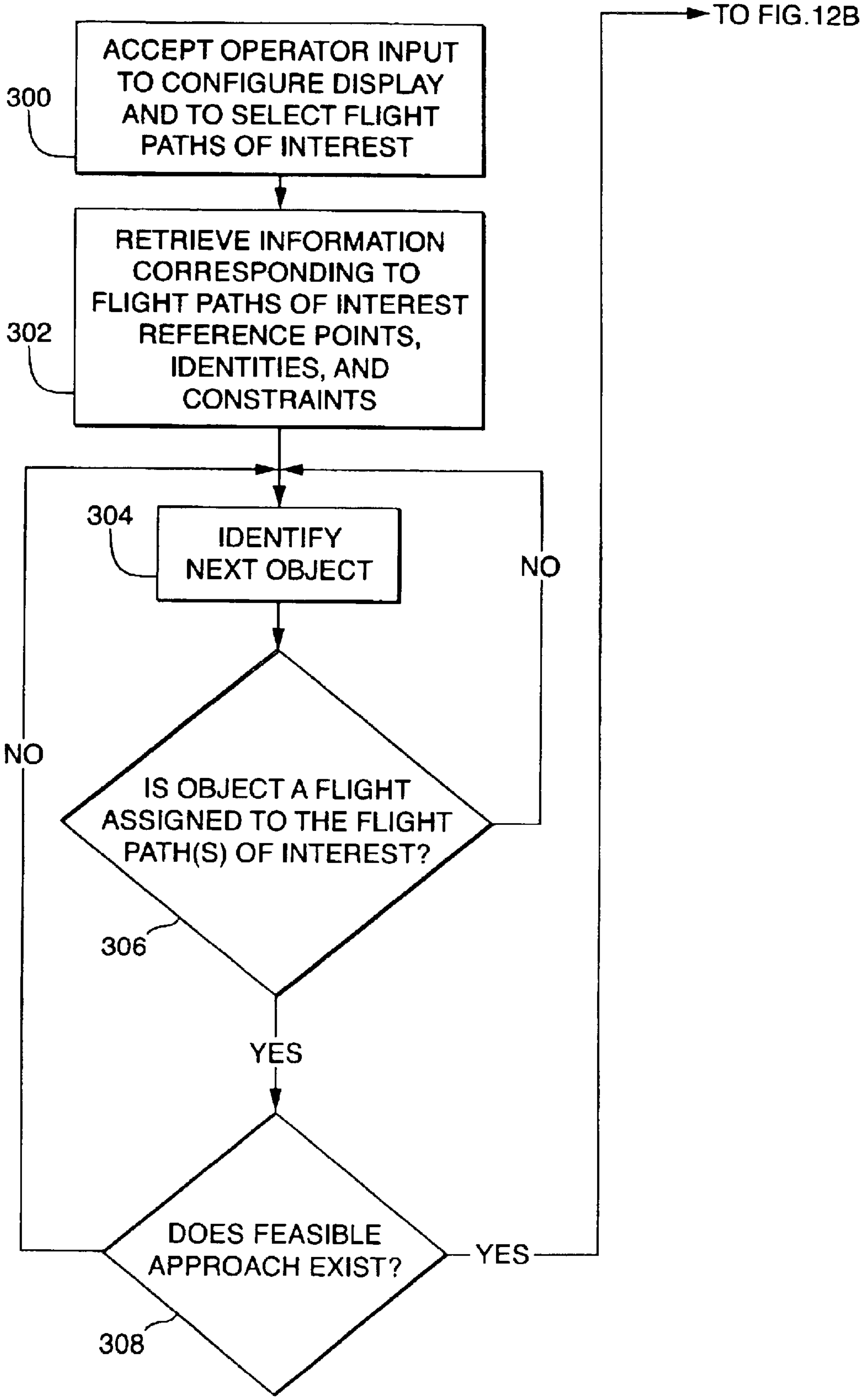
FIGS. 12A and 12B are flow diagrams illustrating the steps for providing a time domain display of the transit times and separation among objects approaching a reference point.
Figure 12B:
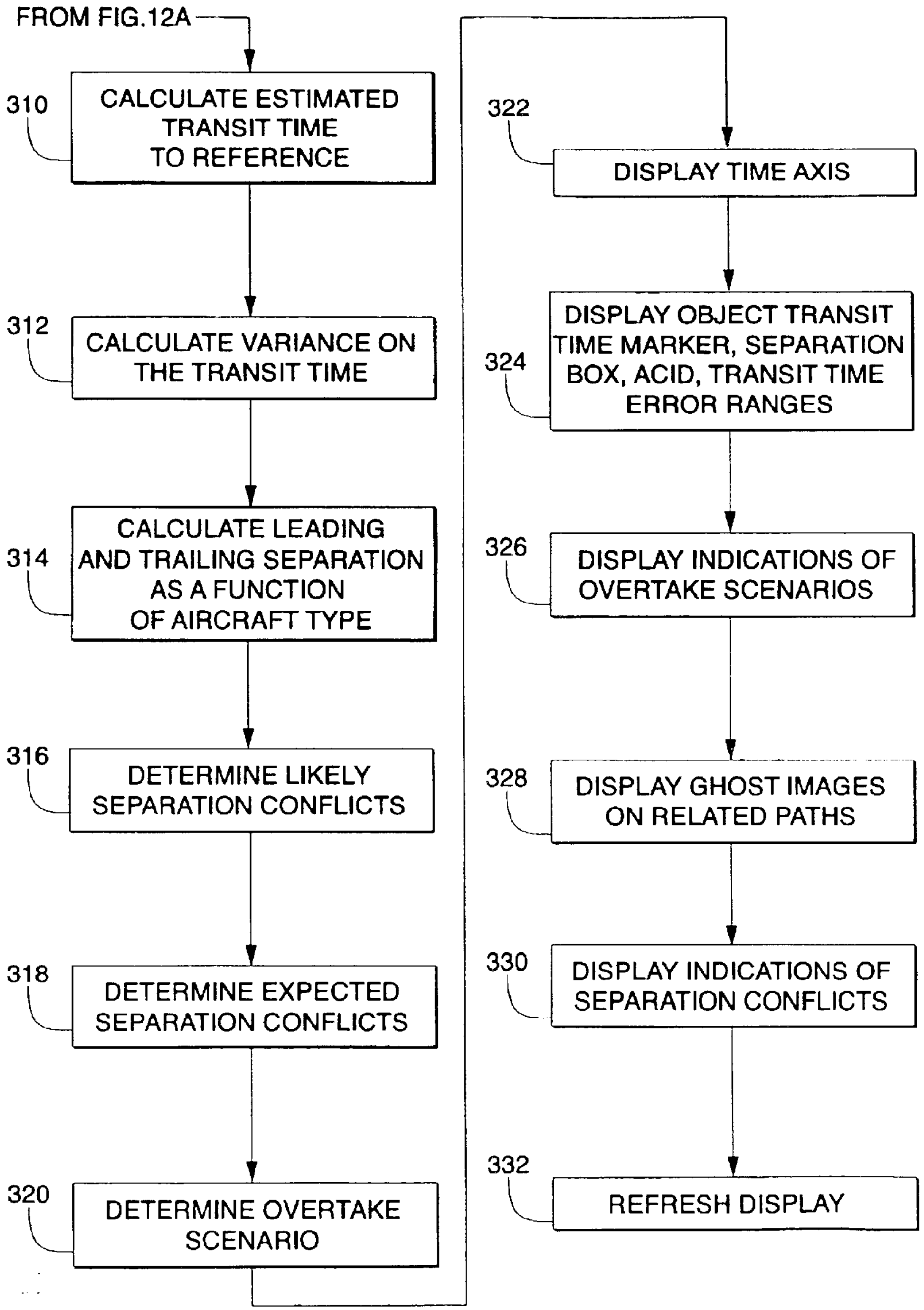

Referring now to FIGS. 12A and 12B, a flow diagram illustrates an exemplary sequence of steps for displaying a separation time of at least one object approaching a reference in accordance with the present invention. In the flow diagrams of FIGS. 12A and 12B, the rectangular elements are herein denoted "processing blocks" (typified by element 300 in FIG. 12A) and represent computer software instructions or groups of instructions. The diamond shaped elements in the flow diagrams are herein denoted "decision blocks" (typified by element 306 in FIG. 12A) and represent computer software instructions or groups of instructions which affect the operation of the processing blocks. Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

At step 300, the system accepts operator input to determine, for example where on the screen the display should be positioned and how the display should be configured, and what are the approaches and flight paths that are of interest to the operator.

At step 302, the system retrieves information for flight paths of interest including reference points, identities, and constraints. This information is used to estimate the transit times and to provide the time domain display. The system also retrieves information for related flight paths to the flight paths of interest. At step 304 the performs a periodic update of the track file and the situation display. The surveillance system provides an updated set of tracks, here the tracks of flight objects, for example, aircrafts within the terminal airspace. Each reported object is associated with a track that includes a position, and a data record associated with the object. The situation display is then updated to remove displayed tracks that are no longer eligible for display, to show updated track positions and data, and to display new tracks. Upon each update, each object included in the update is eligible for further processing.

At step 306, it is determined whether the current object is a flight assigned to at least one of the flight paths of interest. In one example, this is done by examining the runway assignment for the flight as indicated by flight data. If it is determined that the current object is assigned to at least one of the flight paths of interest then processing continues at step 308, otherwise processing continues at step 304 to identify and process the next object.

At step 308, it is determined whether a feasible approach exists for this object, i.e. whether the flight is a candidate flight for further processing. That is, it is determined if there is a nominal flight path that satisfies certain conditions for each candidate flight. Exemplary conditions include the following:

the flight path describes a smooth and differential curve at each point, the velocity of the flight is tangent to the path at its starting point, the path is tangent to the flight course where the path joins the flight course, and the radius of curvature is greater than or equal to the minimum turning radius of the flight at each point.

Velocity and position data for the current object is received from sensors or other systems (e.g., the Automatic Dependent Surveillance Broadcast System or ADS-B) as are known in the art. If it is determined that the flight can reach the reference point by means of a specified standard maneuver that observes specified constraints processing continues at step 310. Otherwise processing continues at step 304 to identify and process the next object.

At step 310, the estimated transit time to the reference is calculated for the current object. A path is predicted for the object and then a speed profile is predicted for the movement of the object along the predicted path at selected points on the path starting at its current position and ending at the reference point. The speed profile gives the speed of the aircraft (which may not be constant) at each point on the path.

At step 312, a variance on the transit time calculated in step 310 is calculated using historical data, for example, the transit times of recent similar type aircraft, having similar object classifications, on previous similar nominal paths, weather including wind conditions, and other factors. Alternatively, a suitable mathematical model for the distribution of the actual transit time is selected and the system computes an expected variance corresponding to a mathematical measure of confidence for the estimated transit time.

At step 314, the leading and trailing separation time interval are calculated. The intervals are generally a function of the aircraft type. A time range for the current object equal to the time interval that starts at the transit time less the leading separation time and that ends at the transit time plus the trailing separation time is thereby determined.

At step 316, the system forms a first time range from the separation time interval and the at least one error range (the leading or trailing errors) of the current object aligned to the transit time of the current object; forms a second time range by using the transit time, separation time interval, one of error ranges of the other objects being displayed; compares the first and second time ranges; determines that a likely separation violation between the at least one object and the displayed object in response to determining an overlap between the time range of the current object and the time range of the displayed object.

At step 318, the system forms a first time range from the separation time interval and of the current object aligned to the transit time of the current object; forms a second time range by using the transit time, separation time interval for each of the other objects being displayed; compares the first and second time ranges; determines that a expected separation violation between the current object and one of the displayed objects in response to determining an overlap between the time range of the current object and the time range of the displayed object.

At step 320, it is determined if the current object that is nominally following an assigned flight course is predicted to overtake another flight that is nominally following the same flight course or if the current object will be overtaken by a flight that is already being displayed. One flight is estimated to overtake another flight if the following are true:

the distance of the first flight from the reference point as measured along its predicted flight path is greater than the same distance for the second flight, and the estimated transit time for the first flight is less than the estimated transit time for the second flight.

In one embodiment, this scenario is determined by comparing the transit time and spatial position of the current object to the transit time and spatial position of each of the displayed objects and determining a shorter transit time and a greater spatial distance to the reference point for the objects being compared. At step 322, a time line axis used for indicating the transit time is displayed or updated to include estimated transit time of the current object in the display.

At step 324, the current object is added to the display as a flight symbol including the transit time markers positioned to indicate the current object's estimated transit time, the separation box, the ACID, and the transit time error ranges for the current object. If the current object is already displayed, the previous associated ensemble will be removed from the display. For each flight that is nominally following an assigned flight course a flight symbol is projected onto the time-display strips that correspond to a flight course of interest. In one embodiment the flight symbols are displayed as indicated in FIG. 6.

At step 326, if the current flight is predicted to be included in an overtake scenario with another flight that is nominally following or destined to follow the same flight course then the flight symbols for both flights are modified. The modification can include a color change, the use of a blinking color, or some other suitable visual or graphical change in the flight symbol. At step 328, ghost images (as described in conjunction with FIGS. 7–9) are displayed on corresponding paths when the paths are related by a common reference point. If the current object is already displayed, the previous associated ghosts will be removed from the display. At step 330, the separation violations determined in steps 316 and 318 are displayed in conjunction with the ghost images displayed in step 328 for the current object. This includes displaying an indication of the likely separation violations and displaying the indication of the expected separation violations.

In one embodiment, if there is an overlap of the flight symbols for two flights that are following different flight courses, the position symbol for the first flight, that appears in the strip corresponding to the flight course that the second flight is nominally following, is modified to indicate the extent and type of overlap. The extent of the modification of the position symbol coincides with the extent of the overlap of the flight symbols. One color is used to indicate an overlap of the error bars that are attached to the flight symbol of one flight, with any part of the flight symbol of the other flight to indicate a likely separation violation. A different color is used to indicate an overlap of the separation box of one flight symbol with the separation box of the other flight symbol to indicate an expected separation violation. At step 332, the display is refreshed and updated to remove objects which are no longer on flight paths of interest and to remove the graphical representations of likely insufficient separation violation which are no longer valid. In one embodiment, when a track update for an object that is currently displayed is received, all associated artifacts (the object ensemble including the flight symbol and any ghost images) are removed from the time-based display. Processing resumes at step 300 to redisplay and update the time domain based display.

Figure 13:
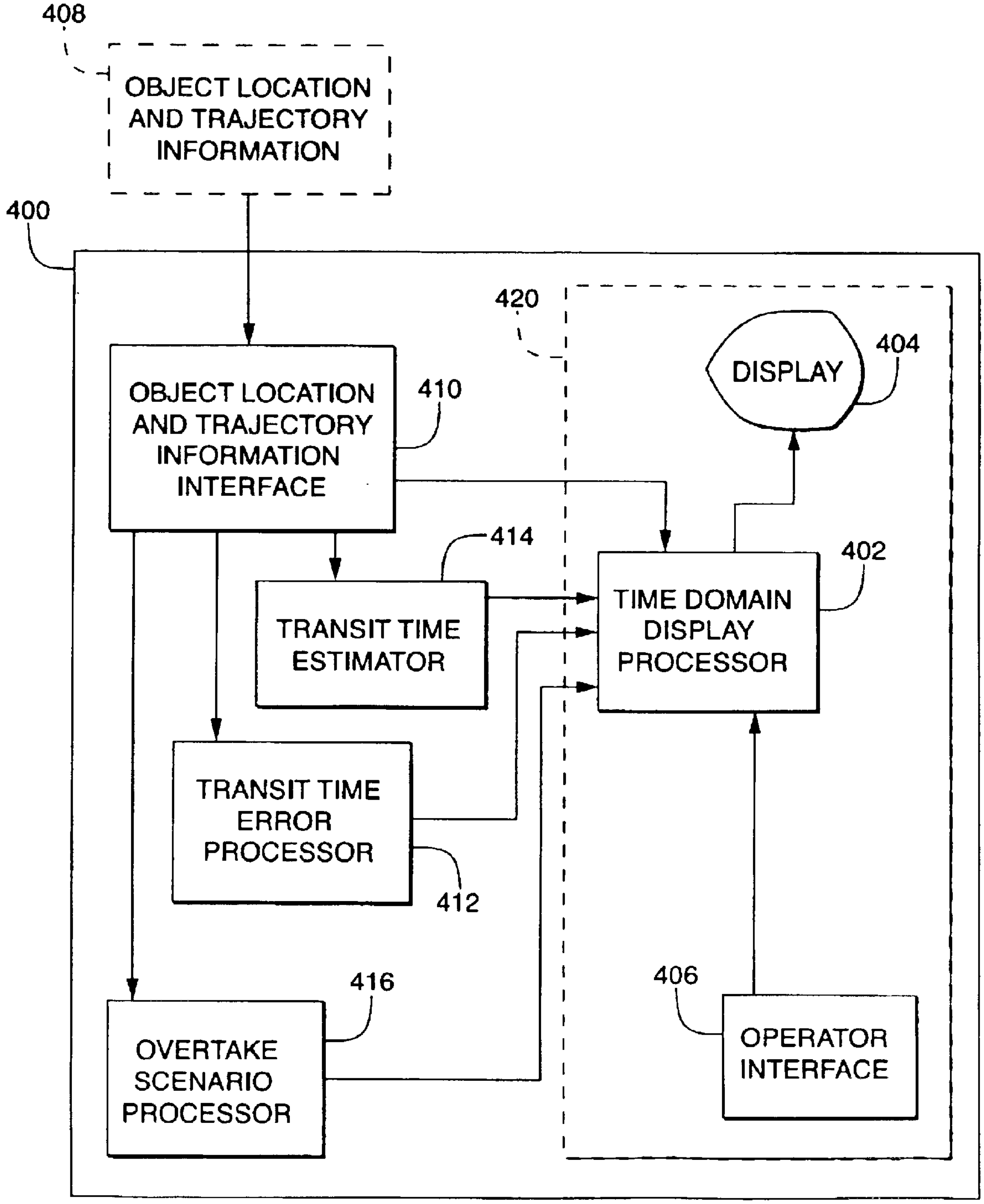
FIG. 13 is a block diagram of a time domain spacing aid system, according to the invention.

Now referring to FIG. 13, an exemplary time domain spacing aid system 400 includes a situation display 420. The situation display 420 includes a time domain display processor 402 coupled to an operator interface 406 and a display 404. The system 400 further includes a transit time estimator 412, a transit time variance processor 414, and an overtake scenario processor 416 which are coupled to an object location and trajectory information interface 410 which is coupled to object location and trajectory information source 408. The blocks denoted "processor," "estimator," "player," and "interface" can represent computer software instructions or groups of instructions. Such processing may be performed by a single processing apparatus which may, for example, be provided as part of the situation display 420, or may be distributed among several processors.

In one embodiment, an operator interacts with the situation display 420 and provides display commands for selecting approaches and flight paths that are of interest using the operator interface 406. The display processor 402 signals the trajectory information interface 410 to retrieve information from the object location and trajectory information source 408. The information source can include, for example, a database having information on approaches and operating flights, and current information received from air surveillance radar systems for the detection and tracking of aircraft. The display processor 402 also receives information from the transit time estimator 412 and the transit time variance processor 414, both of which receive information from the object location and trjectory information source 408 as described in FIGS. 6–9 and steps 310–324 of FIG. 12B. information from the object location and trajectory information source 408 as described in FIGS. 6–9 and steps 310–324 of FIG. 12B.

The overtake scenario processor 416 provides display information to the display processor 402 for displaying overtake scenarios as described in conjunction with FIGS. 10, 11 and step 320 in FIG. 12B. The display processor 402 provides output signals to the display 404 for displaying estimated transit times, separation time intervals including transit time variances, and overtake scenarios.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A method for displaying a separation time interval of at least one of a plurality of objects approaching a reference comprising:

estimating a transit time of the at least one of the plurality of objects assigned to a corresponding first path to the reference;

determining the separation time interval for the at least one object;

displaying a time line axis which includes the estimated transit time of the at least one of the plurality of objects;

displaying a representation of the at least one object aligned relative to the time line axis for indicating the estimated transit time; and displaying the separation time interval.

2. The method of claim 1 further comprising displaying a representation of the corresponding first path.

3. The method of claim 1 wherein indicating the estimated transit time further comprises displaying a time marker.

4. The method of claim 1 wherein displaying the separation time interval further comprises displaying a graphical object having a length parallel to the time line axis for indicating the time interval.

5. The method of claim 4 wherein the graphical object comprises a flight symbol.

6. The method of claim 5 wherein the graphical object comprises displaying a separation box.

7. The method of claim 5 wherein the flight symbol comprises a separation box having a dimension in the direction of the time line axis proportional to sum of a required leading separation time interval and a required trailing separation time interval.

8. The method of claim 1 wherein determining a separation time interval for the at least one object comprises:

determining a leading separation time interval for the at least one object; and determining a trailing separation time interval for the at least one object.

9. The method of claim 8 further comprising displaying an estimated leading error indication disposed adjacent to the representation of the leading separation time interval.

10. The method of claim 8 further comprising displaying an estimated trailing transit time error disposed adjacent to the representation of the trailing separation time interval.

11. The method of claim 8 wherein displaying the separation time interval further comprises displaying a separation box including the leading separation time interval and the trailing separation time interval.

12. The method of claim 11 further comprising displaying an aircraft identification of the at least one object disposed on the separation box.

13. The method of claim 1 wherein estimating the at least one object transit time further comprises computing the time to transit a corresponding first predicted path to the reference using the velocity of the at least one object on a nominal path.

14. The method of claim 1 further comprising:

comparing a time range formed by the separation time interval aligned to the transit time of the at least one object with a time range formed by the separation time interval aligned to the transit time of at least one second different one of the plurality of objects;

determining an expected separation violation between the at least one object and the at least one second different object in response to determining an overlap in time between the time range of the at least one object and the time range of the at least one second different object; and displaying the indication of the expected separation violation.

15. The method of claim 1 further comprising:

comparing a spatial location of the at least one object with a spatial location of a second different one of the plurality of objects;

determining an overtake situation between the at least one object and the at least one second different object in response to determining that the transit time of the at least one object is less than the transit time of the at least one second different object, and that the at least one object is located further in distance from the reference as measured along a predicted path of the object that the at least one second different object; and displaying an indication of the overtake situation.

16. The method of claim 1 further comprising:

determining an error range for each of the plurality of objects including at least one of:

a leading error range of the estimated transit time; and a trailing error range of the estimated transit time.

17. The method of claim 16 wherein determining the error range for each object comprises:

determining an object classification;

retrieving previous transit times determined for objects having a related classification; and computing a mathematical measure of the error range in previous estimated transit times.

18. The method of claim 16 wherein determining the error range for each object comprises:

providing a mathematical model for a distribution of the actual transit time; and computing an expected variance corresponding to a mathematical measure of confidence for the estimated transit time.

19. The method of claim 16 further comprising displaying for each of the plurality of objects at least one of:

an indication of the leading error range of the estimated transit time; and an indication of the trailing error range of the estimated transit time.

20. The method of claim 16 further comprising:

forming a first time range from the separation time interval and the at least one error range of the at least one object aligned to the transit time of the at least one object;

forming a second time range by using the transit time, separation time interval, at least one error ranges of the at least one second different one of the plurality of objects;

comparing the first and second time ranges;

determining a likely separation violation between the at least one object and the at least one second different object in response to determining an overlap between the first time range and the second time range; and displaying an indication of the likely separation violation.

21. The method of claim 20 wherein displaying the indication of the likely violation comprises displaying a symbol having a size proportional to an overlap of first and second time ranges.

22. The method of claim 20 wherein the second different object is assigned to a corresponding second different path to the reference and displaying an indication of the likely separation violation comprises displaying a ghost image corresponding to the second different object, aligned relative to the time line axis for indicating the estimated second transit time disposed proximate to the representation of the at least one object.

23. The method of claim 1 further comprising:

estimating a second transit time of at least one second different one of the plurality of objects assigned to a corresponding second different path to the reference; and displaying a ghost image corresponding to the second different object, aligned relative to the time line axis for indicating the estimated second transit time disposed proximate to the representation of the at least one object.

24. The method of claim 23 further comprising displaying a representation of the first path wherein the ghost image and the representation of the first object are displayed proximate a representation of the corresponding first path.

25. The method of claim 24 wherein the representation of the corresponding first path comprises a line substantially parallel to the time line axis and adjacent indicia of the assigned path.

26. The method of claim 23 further comprising displaying an indication of an expected separation violation between the first object and the at least one second different object.

27. The method of claim 23 further comprising displaying an indication of a likely separation violation between the first object and the at least one second different object.

28. The method of claim 1 wherein displaying the representation of the at least one object further comprises determining whether the at least one object is a candidate to arrive at the reference.

29. The method of claim 28 wherein determining that the object is a candidate to arrive at the reference comprises determining if the flight can reach the reference point by a plurality of standard maneuvers that observe predetermined constraints.

30. The method of claim 1 further comprising displaying a representation of at least one second different object wherein the second different object is assigned to the corresponding first path to the reference.

31. The method of claim 1 further comprising displaying an aircraft identification disposed on the representation of a first object.

32. The method of claim 1 further comprising displaying a timing mark corresponding to a point on the first axis representing the estimated first object transit time.

33. The method of claim 1 wherein the plurality of object comprises a plurality of flight objects.

34. The method of claim 1 wherein the time line axis, the representation of the at least one object, and the separation time interval are displayed on a situation display.

35. A multiple approach time domain spacing aid display system comprising:

an object location and trajectory information interface;

a transit time estimator coupled to said object location and trajectory information interface; and a situation display coupled to said transit time estimator for displaying an estimated transit time within a terminal air space.

36. The system of claim 35 further comprising a transit time variance processor coupled to said situation display and said object location and trajectory information interface.

37. The system of claim 35 wherein said situation display comprises:

an operator interface;

a display processor adapted to receive commands from said operator interface adapted to provide output signals for displaying an estimated transit time, and a separation time interval; and a display adapted to receive the output signals from said display processor.

38. The system of claim 37 wherein the display processor is further adapted to provide signals to said display for displaying ghost images including indications of a separation time conflict.

39. The system of claim 35 further comprising an overtake scenario processor and wherein the display processor is further adapted to provide signals to said display for indications of an overtake scenarios.

* * * * *

UNITED STATES PATENT AND TRADEMARK OFFICE

CERTIFICATE OF CORRECTION

PATENT NO. : 6,912,461 B2
DATED : June 28, 2005
INVENTOR(S) : Poreda

It is certified that error appears in the above-identified patent and that said Letters Patent is hereby corrected as shown below:

<u>Column 4,</u>
Line 44, delete "that the second" and replace with -- than the second --.
Line 46, delete "technique the" and replace with -- technique, the --.

<u>Column 5,</u>
Line 37, delete "invention some" and replace with -- invention, some --.

<u>Column 7,</u>
Line 48, delete "fifth and sixth fix" and replace with -- fifth and sixth fixes --.

<u>Column 8,</u>
Line 7, delete "aircraft this" and replace with -- aircraft, this --.

<u>Column 9,</u>
Line 25, delete "including for example" and replace with -- including, for example, --.

<u>Column 10,</u>
Lines 18-19, delete "into up to eight" and replace with -- into eight --.
Line 34, delete "a horizontal strips" and replace with -- horizontal strips --.
Line 50, delete "flight symbol" and replace with -- flight symbols --.
Line 57, delete "one of plurality" and replace with -- one of a plurality --.

<u>Column 11,</u>
Lines 27-28, delete "by flight symbol 94b and flight symbol 94b." and replace with -- by flight symbol 94b. --.
Line 33, delete "will be not be" and replace with -- will not be --.
Line 37, delete "two flights" and replace with -- two flights. --.

<u>Column 12,</u>
Line 45, delete "flight C102 the" and replace with -- flight C102, the --.

<u>Column 14,</u>
Line 23, delete "constraints processing" and replace with -- constraints, processing --.

<u>Column 15,</u>
Line 32, delete "flight course a" and replace with -- flight course, a --.
Line 34, delete "In one embodiment the" and replace with -- In one embodiment, the --.
Line 38, delete "flight course then" and replace with -- flight course, then --.

<u>Column 16,</u>
Delete lines 40, 41 and 42.

UNITED STATES PATENT AND TRADEMARK OFFICE

CERTIFICATE OF CORRECTION

PATENT NO. : 6,912,461 B2
DATED : June 28, 2005
INVENTOR(S) : Poreda

It is certified that error appears in the above-identified patent and that said Letters Patent is hereby corrected as shown below:

<u>Column 18,</u>
Line 6, delete “object that the” and replace with -- object than the --.
Line 41, delete “at least one error ranges” and replace with -- at least one error range --.

<u>Column 20,</u>
Line 1, delete “plurality of object” and replace with -- plurality of objects --.
Line 39, delete “scenarios.” and replace with -- scenario. --.

Signed and Sealed this

Twenty-first Day of March, 2006

JON W. DUDAS
*Director of the United States Patent and Trademark Office*